T. MASON.
DRAIN PIPE CONNECTION.
APPLICATION FILED FEB. 18, 1916.

1,198,565.

Patented Sept. 19, 1916.

WITNESSES:
Frederick Kimlin
Louis A. Fitzer

INVENTOR.
Thomas Mason
BY
ATTORNEY

UNITED STATES PATENT OFFICE.

THOMAS MASON, OF EAST ORANGE, NEW JERSEY.

DRAIN-PIPE CONNECTION.

1,198,565.  Specification of Letters Patent.  Patented Sept. 19, 1916.

Application filed February 18, 1916. Serial No. 79,041.

*To all whom it may concern:*

Be it known that I, THOMAS MASON, a citizen of the United States, and resident of East Orange, in the county of Essex and State of New Jersey, have invented certain new and useful Improvements in Drain-Pipe Connections, of which the following is a specification.

My invention relates to couplings for connecting drain pipes, either iron or lead, with a urinal, shower, or other plumbing appliances which are usually placed above the floor, and has for its objects the production of a coupling which is adjustable to varying heights, and to which a drain pipe can be quickly and securely connected.

Figure 1:
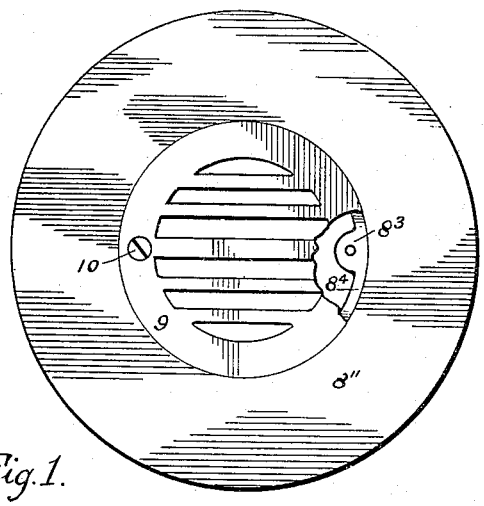
Figure 2:
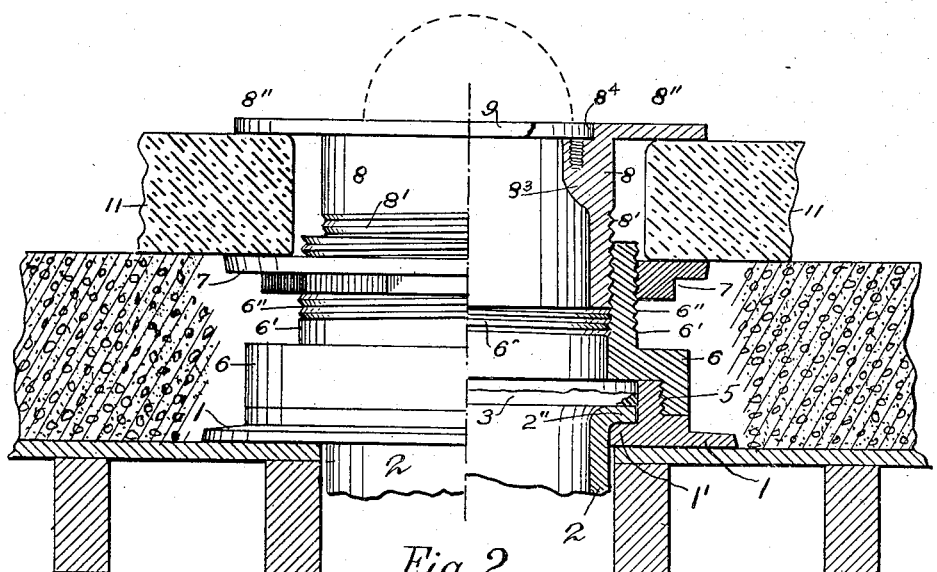
Figure 3:
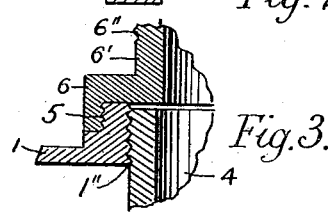

In the accompanying drawings, Figure 1 is a plan view of the upper plate of the coupling, the flat strainer being partly broken away for clearness of illustration; Fig. 2 is a side elevation, one half being shown in center section, and Fig. 3, is a section of a floor plate adapted for iron pipe connection.

Similar reference characters denote like parts in the several views.

The floor plate, 1, is of a suitable diameter to adapt it for connection with the drain pipe, 2. If for lead,—as in Fig. 2—the annular inner flange, 1', may be slightly rounded at its upper edge so that the lead pipe can be flanged, 2'' and held in place by solder, 3 : if for iron pipe, this annular flange may be omitted and a thread, 1'', be provided instead, into which the iron drain pipe, 4, is screwed. The plate may also be adapted for connecting with cast iron pipe, this being merely a mechanical detail. The male thread, 5, on the plate is for the purpose of securing it to a shoulder nipple, 6, which may vary in length in the neck, 6', to suit requirements. At its base it is internally threaded to engage the threaded part, 5, of the floor plate: the neck, 6', is externally threaded, 6'', a washer nut, 7, engages this thread. The upper end of the neck is internally threaded, 6³, some distance down, into which threaded part a plate-nipple, 8, screws. This nipple consists of the threaded part 8' and flange, 8''. Two internal lugs, 8³, are oppositely disposed for the dual purpose of securing the strainer, 9, and also to afford a method for screwing this nipple down into place (or unscrewing it) by means of a common straddle wrench,—not shown,—or any flat tool fitting into the upper opening, the two lugs forming a resistance against which the tool acts. The lugs are drilled and tapped for the reception of a screw, 10. The flange is preferably recessed, 8⁴, as shown, for the reception of the flat strainer, 9, or if desired a so called "bee-hive" strainer (shown by dotted lines in Fig. 2) can be used.

The floor of the urinal—or tiling—is indicated by 11.

Such being the general construction, the operation is as follows: The coupling can be properly called a "built up" one, that is, the floor plate is first secured to the pipe and the parts are connected up in succession, all the work being in sight during the operation, so it can be quickly and properly accomplished. In placing, say a vertical urinal, the distance from the floor to the underside of urinal usually varies, so it is only necessary to select a fitting suited for the diameter of the pipe, either lead, iron or brass, as my improved fitting is adjustable in height. The floor plate is set in place and the pipe connected with it in a substantial manner. The nipple, 6, is screwed in place solidly upon the plate, with the washer nut, 7, well screwed down. The urinal is then positioned on the nipple and the washer nut backed up until it contacts with the bottom of the urinal. (If desired a rubber or other washer—not shown—may be placed on the washer nut, as usual). When the urinal has been properly set upon its supporting foundation and made fast, the plate-nipple, with strainer removed, is screwed down solidly against the urinal which is then held securely between the washer nut 7 and the plate 8''. A suitable strainer is then placed in its position on the plate and the urinal is ready for use when the flushing device is attached.

What I claim as new is:—

A pipe coupling for urinals, showers and the like comprising a floor plate having an upstanding annular flange externally threaded and positioned to define inner and outer flanges, a drain pipe flanged at its upper end for seating on the inner flange, sealing means for the flanged end of the drain pipe, a nipple having an internally threaded lower flange received on the floor plate threaded flange with the adjacent parts contacting, the said nipple having an internally and externally threaded neck portion, an externally threaded plate nipple received in and engaging the internal threads on the said nipple neck, a peripheral flange carried by the upper end of the plate nipple, said plate nipple having an annular recess formed in the upper end thereof, a strainer removably received in said recess and a peripherally flanged washer nut threaded on the external threads of the nipple neck, the said washer nut flange and plate nipple flange adapted to positively engage the floor tiling whereby the parts are rigidly supported.

Signed at New York city, in the county and State of New York, this 17th day of February, A. D. 1916.

THOMAS MASON.

Witnesses:
ERNEST WANITSHKA,
THOMAS MCMENAMY.

Copies of this patent may be obtained for five cents each, by addressing the "Commissioner of Patents, Washington, D. C."